US012236065B2

(12) United States Patent
Quibriac et al.

(10) Patent No.: US 12,236,065 B2
(45) Date of Patent: Feb. 25, 2025

(54) SYSTEM FOR REMOTE CONTROLS AND DISPLAYS FOR AN INDUSTRIAL VEHICLE

(71) Applicant: Volvo Truck Corporation, Gothenburg (SE)

(72) Inventors: Yann Quibriac, Lyons (FR); Nicolas Perraud, Genas (FR)

(73) Assignee: Volvo Truck Corporation, Gothenburg (SE)

( * ) Notice: Subject to any disclaimer, the term of this patent is extended or adjusted under 35 U.S.C. 154(b) by 40 days.

(21) Appl. No.: 18/303,655

(22) Filed: Apr. 20, 2023

(65) Prior Publication Data
US 2023/0342014 A1  Oct. 26, 2023

(30) Foreign Application Priority Data

Apr. 26, 2022 (EP) .................................... 22169916

(51) Int. Cl.
*H04N 7/18* (2006.01)
*B60N 2/00* (2006.01)
(Continued)

(52) U.S. Cl.
CPC ......... *G06F 3/04842* (2013.01); *B60N 2/002* (2013.01); *G06T 7/70* (2017.01);
(Continued)

(58) Field of Classification Search
CPC .................. G06F 3/04842; G06T 7/70; G06T 2207/30196; G06T 2207/30248; B60N 2/002; G08C 17/02; H04N 7/18
(Continued)

(56) References Cited

U.S. PATENT DOCUMENTS 6,366,840 B1 *  4/2002  Buckley .................... G06F 7/00
340/425.5
6,622,083 B1 *  9/2003  Knockeart ......... G01C 21/3679
701/428
(Continued)

FOREIGN PATENT DOCUMENTS

DE     102006060514 A1     6/2008
DE     102016012283 A1     4/2017
(Continued)

OTHER PUBLICATIONS

Extended European Search Report for European Patent Application No. 22169916.8, mailed Oct. 18, 2022, 5 pages.

*Primary Examiner* — Trang U Tran
(74) *Attorney, Agent, or Firm* — Withrow & Terranova, PLLC

(57) ABSTRACT

A system for remote control displays and controls of truck functions which comprises a remote control device with a display with display control means for at least two user interfaces, each user interface corresponding to a predetermined set of truck functions, wireless transmission and reception means, and input means for selecting a function proposed on the display; actuation means corresponding to the proposed truck functions; and at least a sensor for detecting a position of a person and/or of the remote control device, wherein the display control means are configured to propose functions on the display depending on the information received from the at least one sensor for detecting a position.

14 Claims, 2 Drawing Sheets

(51) Int. Cl.
    *G06F 3/04842* (2022.01)
    *G06T 7/70* (2017.01)
    *G08C 17/02* (2006.01)
(52) U.S. Cl.
    CPC .... *G08C 17/02* (2013.01); *G06T 2207/30196* (2013.01); *G06T 2207/30248* (2013.01)
(58) Field of Classification Search
    USPC .......................................................... 348/148
    See application file for complete search history.

(56) References Cited

U.S. PATENT DOCUMENTS

| | | | |
|---|---|---|---|
| 10,180,785 B2 * | 1/2019 | Dickow | B60K 35/60 |
| 2020/0016998 A1 | 1/2020 | Frohriep et al. | |
| 2023/0041189 A1 * | 2/2023 | Irle | H01Q 1/3208 |

FOREIGN PATENT DOCUMENTS

| | | | | |
|---|---|---|---|---|
| DE | 102020105042 A1 | | 8/2021 | |
| FR | 2875049 A1 * | | 3/2006 | G08G 1/133 |

* cited by examiner

SYSTEM FOR REMOTE CONTROLS AND DISPLAYS FOR AN INDUSTRIAL VEHICLE

RELATED APPLICATIONS

The present application claims priority to European Patent Application No. 22169916.8, filed on Apr. 26, 2022, and entitled "SYSTEM FOR REMOTE CONTROLS AND DISPLAYS FOR AN INDUSTRIAL VEHICLE," which is incorporated herein by reference in its entirety.

TECHNICAL FIELD

This disclosure relates to a system for remote controls and displays for an industrial vehicle.

BACKGROUND ART

Industrial vehicles such as trucks are equipped with several remote controls. Each remote control is available in a specific area of the cab and relates to specific functions. For example, a truck may have a remote control for electrical controlled suspension (RCECS). This remote control is for example placed near the driver's seat. This remote control is connected in most cases by wire to the truck. This ensures a good connection, and the remote control cannot get lost.

If the truck comprises a bunk area, this area may also comprise a living environment control module (LECM) which is usually connected by wire to the truck. A third remote control is often foreseen by a bodybuilder and it controls specific functions corresponding to the specific equipment provided by the body builder. Specific functions of bodybuilder can include the following without any limitation purpose: a dump collection equipment with a garbage compactor an on board-crane, stabilization telescopic feet, cargo air conditioning system, concrete delivery rotating container, a tipping trailer, an aerial bucket, etc.

FR2875049 discloses an information system having a wireless communication equipment communicating with another equipment in a portable computer and receiving information relative to a vehicle and/or its environment. A software unit implemented on the computer permits to simultaneously display various information relative to the vehicle and/or its environment on a screen, based on selection carried out by a vehicle's driver and/or vehicle's state. The wireless communication equipment is presented under the form of personal computer memory card internal association card, memory card, or universal serial bus key. This document does not disclose a control device but an information device.

DE 10 2020 105 042 relates to a method for setting an operating device of a vehicle, the operating device having at least one variably adjustable operating element, and depending on a current context that arises for the vehicle, a user of the vehicle, a selection of functions for assigning the at least one variable control element is proposed, with the user selecting at least one function for the at least one variably adjustable control element, with this at least one function being assigned to the at least one variably adjustable control element is assigned. This document concerns a control device with an adjustable display.

There is therefore a need to provide solutions that improve the user experience for the driver and make it easier. Preferably, the proposed solution will be easily adapted on trucks and will not increase the cost of the control systems.

SUMMARY

To achieve this goal, a system for remote control displays and controls of truck functions is proposed. This system comprises:
- a remote control device with:
  - a display with display control means for at least two user interfaces, each user interface corresponding to a predetermined set of truck functions,
  - wireless transmission and reception means, and
  - input means for selecting a function proposed on the display,
- actuation means corresponding to the proposed truck functions,
- at least a sensor for detecting a position of a person and/or of the remote control device, wherein the display control means are configured to propose functions on the display depending on the information received from the at least one sensor for detecting a position.

This system allows having only one remote control device for the vehicle operation. The contextualized controls and displays depending on the driver position improve the user experience for the driver. The driver can keep the remote control device in his pocket and thus always have access to the truck functions.

To make the system simpler, the remote control device may be remotely connected to a single connecting point including the reception means and in relation with a control unit.

In an embodiment, there are at least three sensors using Ultra Wide Band (UWB) technology for detecting the position of the remote control device. This technology can give a precise position/location of the remote control device and the information is reliable.

In a further embodiment, the system may comprise a seat sensor. Such a sensor is very often present in a truck, and it is advantageous to take into account the information given by this sensor.

The system may comprise a bunk mattress sensor. This sensor can give a reliable information on the position of the driver when he is in the bunk area.

The system may comprise a camera for controlling a position of a person in-out of a cab of the truck. Trucks often have cameras to allow the driver to monitor the blind spots around the vehicle. These cameras can advantageously be used for detecting the position of the driver when he is out of the cab. A camera can also be used in the cab for detecting the driver in the cab.

In a further embodiment, the system may comprise ultra sonic sensors. These sensors detect a movement and can be used in addition to other sensors to confirm an information given by these other sensors. An ultra sonic sensor can for example detect when the driver goes into or out of the cab.

In a further embodiment, the remote control device may comprise a touchscreen and/or hardware buttons. The touchscreen and/or the buttons are input means. These means improve the ergonomics of the remote control device.

In a further embodiment, the remote control device may comprise a display and/or at least a LED and/or a sound feedback and/or a vibration feedback. An advantageous embodiment comprises at least a visual and an audio or tactile output so that the driver can receive an information from the remote control device even if he does not see it.

In a further embodiment, the remote control device may comprise an inclination sensor or inclinometer, and possibly the remote control device may comprise a motion sensor.

A method for controlling a proposal of functions on a display of a remote control device is also proposed. This method comprises:
- detection by at least one sensor of the location of a person and/or of the remote control device inside or outside an industrial vehicle,
- transmission of the detected position of the person and/or the remote control device to a control unit,
- determination of an user interface among predetermined user interfaces according to the detected position of the person and/or the remote control device and wherein each user interface proposes a set of truck functions that can be controlled by the remote control device,
- displaying the determined user interface on the display.

This method allows having only one remote control device for the vehicle operation. The contextualized controls and displays depending on the driver position improve the user experience for the driver.

Sharing a single remote control device for various distinct functions is more convenient for a truck driver, and can possibly reduce the overall cost of the whole system.

In this method, if a person is detected inside the industrial vehicle, a further step may determine if the person is sitting on a seat or lying on a bunk mattress. This method gives a more precise location of the driver and can improve the user experience for the driver. A different user interface can be proposed to the driver if he is sitting on his seat or lying on the bunk mattress.

In order to adapt the display on the remote control device, the spatial orientation of the remote control device may be detected.

In order to monitor more accurately the display of the user interfaces on the remote control device, the method may comprise the detection of the position of a person and the detection of the position of the remote control device.

To adapt the functions proposed on the display to the need of the driver, at least three user interfaces are proposed in an alternative embodiment:
- at least one user interface is proposed if the person and/or the remote control device is detected outside the industrial vehicle;
- at least one user interface is proposed if the person and/or the remote control device is detected sitting on a seat inside a cab of the industrial vehicle;
- at least one user interface is proposed if the person and/or the remote control device is detected in a bunk area of the cab of the industrial vehicle.

A truck comprising a system for remote control displays and controls of truck functions as defined here above is also proposed.

BRIEF DESCRIPTION OF DRAWINGS

Other features, details and advantages will be shown in the following detailed description and on the figures, on which.

DETAILED DESCRIPTION

In order to make the figures easier to read, the various elements are not necessarily represented to scale. In these figures, identical elements receive the same reference number. Certain elements or parameters can be indexed, i.e., designated for example by first element or second element, or first parameter and second parameter, etc.

Figure 1:
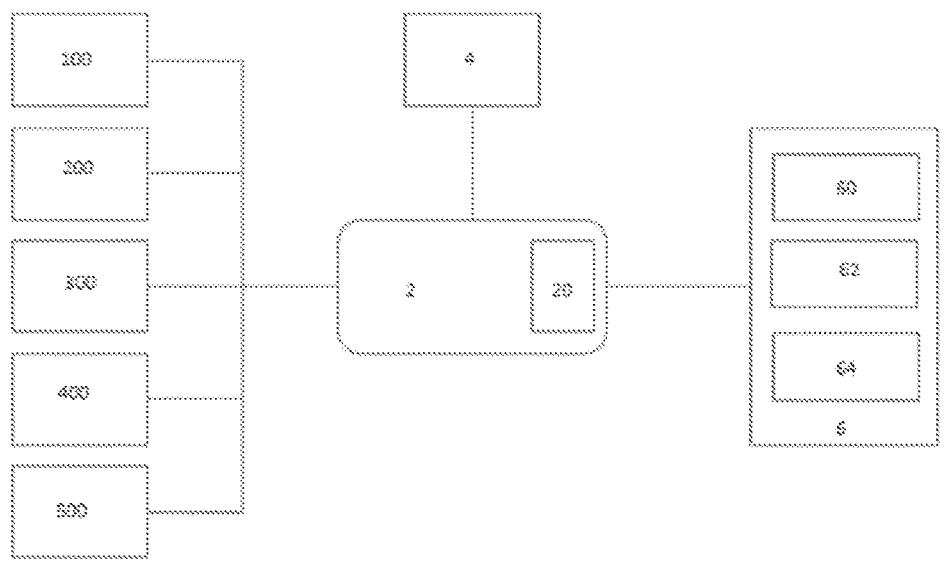
FIG. 1 is a system overview for remote control displays and controls of truck functions

FIG. 1 shows on the left sensors, in the centre an electronic control unit 2 and a controlled equipment 4, and on the right a remote control 6. In this disclosure, this system is built in a vehicle like a truck, for example a light, medium or heavy duty vehicle.

The remote control device 6 is an electronic device with a casing equipped with input means 60 and output means with a display 62. This remote control device 6 may look like a mobile phone, or a tablet computer. In this case, the display 62 may be a touchscreen so that the input means 60 are built-in the display 62.

The remote control device 6 may also be a controller with a display 62 and input means 60 formed by hardware buttons placed along one or more edges of said display 62.

The remote control device 6 may also have output means like LEDs. One (or more) LED may be associated to a hardware button. The output means may be visual means (display, light(s)) but they may also be audio means like speaker(s) or tactile means like a vibration generator, e.g., haptic feedback.

The remote control device 6 is a wireless device. To communicate with the electronic control unit 2, it comprises wireless reception/transmission means 64. The electronic control unit 2 comprises on its side corresponding wireless transmission/reception means 20. The reception/transmission means 64 communicate with the transmission/reception means 20 over a network. For example, the network may include a short-range network (e.g., Bluetooth, ultra-wideband, Wi-Fi, NFC).

The vehicle, namely a truck 50 (FIG. 2) comprising this system for remote control displays and controls of truck functions may comprise several electronic control units. For example, the comfort devices (windows opening and/or light and/or radio) may be controlled by an electronic control unit and another (one or more) electronic control device may control functions concerning directly the vehicle (e.g., suspension) or bodybuilder functions. As a non-exhaustive example, a first set of truck functions may concern the command of the comfort devices, a second set of truck functions may concern the command of the function concerning the vehicle and a third set of functions may concern the bodybuilder functions. Preferably, a single electronic control unit (electronic control unit 2) is equipped with wireless transmission/reception means 20 able to communication with the remote control device 6. The electronic control units may communicate with each other by multiplexing. Said otherwise the electronic control unit 2 acts as a gateway for controlling various pieces of equipment.

FIG. 1 shows a controlled equipment 4 in connection with the electronic control unit 2. In accordance with the preceding paragraph, the electronic control unit 2 may be directly connected to the controlled equipment or through a wired network and possibly through another control unit. The corresponding control unit comprises the actuation means for the controlled equipment 4. This equipment can be monitored by an input on the remote control device 6. The command is transmitted by the remote control device 6 to the electronic control unit 2 which can directly, or through multiplexing for example, send an actuation command to the controlled equipment.

Figure 2:
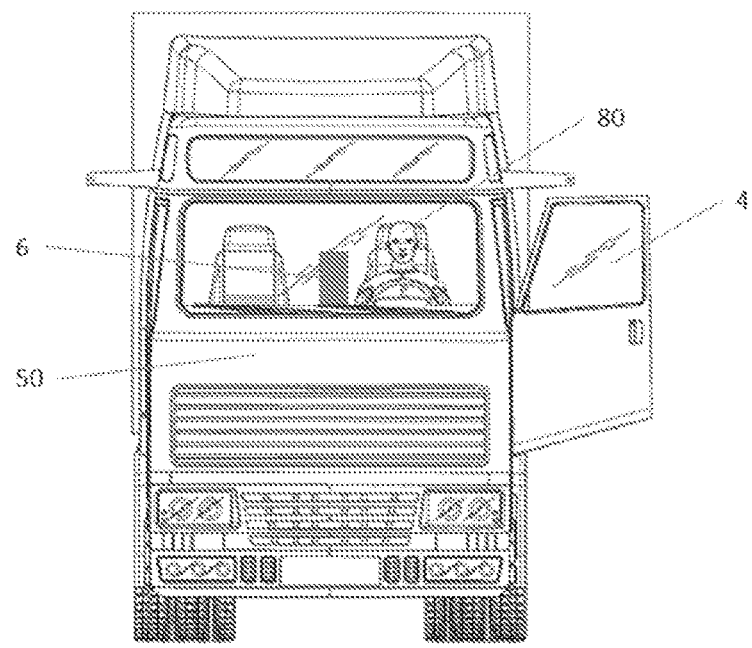
FIG. 2 is a truck having a system of FIG. 1.

Although FIG. 1 only shows a controlled equipment 4, the remote control device 6 and the disclosed system are designed to control a large number of pieces of equipment like controlled equipment 4 (for example window of FIG. 2). The system is designed for controlling all the functions that are usually controlled with a remote control (and eventually also more functions) with only one remote control, i.e., the remote control device 6. To this end, it is proposed the input means 60 and the output means with the display 62 are contextualized depending on the position of the driver 80 and/or of the remote control device 6. In this way for example, if the driver 80 is outside of the vehicle with the remote control device 6, the display 62 will present information and/or will propose functions which are different of the information and/or functions presented or proposed when the driver 80 is in the vehicle with the remote control device 6. In other words, the display 62 of the remote control device 6 is configured to display at least two different user interfaces depending of the position of the driver 80 and/or of the remote control device 6. The input means are also contextualised according to driver location, or remote control device 6 location, in-out of the vehicle (or of a cab of the vehicle).

The electronic control unit 2 is designed for determining the position of the driver 80 and/or of the remote control device 6 according to information received from the sensors.

FIG. 1 shows five sensors. The system can work with less sensors and also with more sensors. The following description gives examples of sensors that can be used for determining the position of the driver 80 and/or of the remote control device 6 (location in-out of the vehicle). This is not an exhaustive list of sensors which can be used in relation to the described system. With the help of following sensors (or other ones), the system can determine the driver 80 and/or remote control device 6 location. The system interprets then the driver intention and proposes him a specific group of functions (for example radio on/off, light on/off, if the driver 80 lies in a bunk area of the vehicle). The inputs of the remote control device 6 are also contextualized in accordance with the user interface shown by the display and the position of the driver 80 and/or remote control device 6.

Reference 100 on FIG. 1 may refer to a bunk mattress sensor that is able to determine the presence of a person (the driver 80) on the bunk mattress. Bunk mattress sensor can be a weight sensor in the bedding or can be an infrared presence detector.

Reference 200 on FIG. 1 may refer to a camera or more generally to a video surveillance system which is able to determine the presence of a person in a predetermined area. A camera may be positioned in a cab of the vehicle for detecting a person inside the cab. A camera may be placed in addition or instead of the camera in the cab for detecting a person outside the vehicle, for example at the back of the vehicle.

Reference 300 on FIG. 1 may refer to a seat sensor. Such a sensor is usually used to detect the presence of a person on a seat. It can be used in combination with a sensor detecting if the corresponding seat belt is fastened and an alarm may be triggered if a person sits on the seat and the seat belt is not fastened. This seat sensor may also be connected to electronic control unit 2 and may inform the system if the driver 80 sits on his seat.

Reference 400 on FIG. 1 refers to a radar sensor. Such a sensor can detect a movement of a person. Another similar sensor may be used, for example a lidar sensor or an ultra sonic sensor. A radar sensor or a similar sensor accurately placed in the cab of the vehicle is able to detect if the driver 80 is in the cab or may detect when the driver 80 goes in or out of the cab.

Reference 500 on FIG. 1 refers to a Bluetooth beacon. This kind of sensor is preferably a Bluetooth low energy (or BLE) beacon. This kind of sensor accurately placed in the cab can determine if the remote control device 6 is located in the cab or not.

As an alternative to a Bluetooth beacon, a set of three sensors using ultra wide band technology can be used to determine the location of the remote control device 6. Each sensor can determine the distance between it and the remote control device 6. Since the location of each of these three sensors is known, it is possible to determine the location of the remote control device 6. This ultra wide band (UWB) system can precisely locate the remote control device 6 in or out of the cab of the vehicle.

According to one embodiment there may be provided various antennas arranged at the vehicle cabin and configured to cooperate with the remote control device 6 in order to determine which antenna receives the most powerful signal from the remote control device in response to radio waves impinged from the antennas. Such antennas can be arranged in the driver door, in the external rear view mirror, in the internal rear view mirror, in the dashboard, etc.

The system for remote control displays and controls of truck functions may for example comprise sensors, e.g., a camera(s), which allow to determine if the driver 80 is in the cab of the vehicle and/or other sensors, e.g., three UWB sensors, which allow to determine the position of the remote control device 6.

Figure 3:
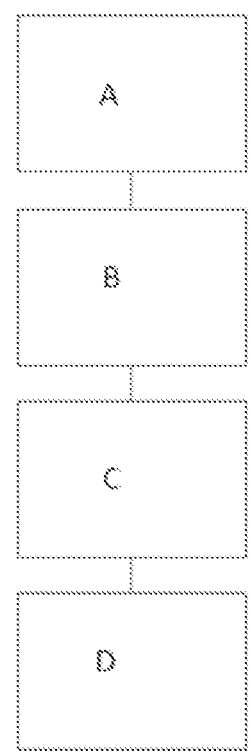
FIG. 3 is a diagram corresponding to a method for controlling a proposal of functions on a display of a remote control device.

The system for remote control displays and controls of truck functions shown on FIG. 1 may work in the following way (FIG. 3):

The sensors (100 and/or 200 and/or 300 and/or 400 and/or 500 and/or other sensors) are working to detect (step A), and eventually to locate, a driver 80 of the corresponding vehicle, for example a truck, and/or to detect, and eventually to locate, the remote control device 6.

The information given by one (or more) sensor(s) is transmitted (step B) to the electronic control unit 2 which monitors the driver 80 and/or remote control device 6 location. For example, the electronic control unit 2 may monitor the location of the driver 80 and may take in account three different position of the driver. The location of the driver is in or out of the cab of the truck (or another industrial vehicle). If the driver 80 is in the cab of the truck, he can be in the bunk area or not. The same can be done for the remote control device 6: it can be out of the cab, in the cab and in this case it is or not in the bunk area. Nine different cases can be envisaged. For each of these cases, a predetermined master for the user interface of the remote control device 6, i.e., a master for the inputs and outputs of the remote control device 6, is foreseen. The electronic control unit 2 determines the adapted master of user interface among the predetermined masters (step C) according to the location of the driver 80 and/or of the remote control device 6. A same master, or user interface, can correspond to two or more cases among the nine cases. The contextualised master is stored in a memory of the remote control device 6 and the electronic control unit 2 informs the remote control device 6 about the user interface (for example chosen between three different user interfaces) which has to be used. The remote control device 6 adapts the user interface (output means including the display and input means) in accordance with the information received from the electronic control unit 2 (step D).

Each user interface proposes different truck functions to the driver 80. For example, if the driver 80 is located in the bunk area, the display 62 will give information about entertainment devices (TV, radio) and comfort devices (light, temperature) and the input means will correspond to actions on these devices: more or less loud, light on/off, action on the climate control. If the driver 80 is out of the cab of the vehicle, the user interface on the remote control device will propose for example a set of functions concerning the bodybuilder and the suspension of the vehicle.

The remote control device 6 may also include a gravity sensor and the user interface on the display 62 can be adapted according to the spatial orientation of the remote control device 6 detected by the gravity sensor.

If the driver 80 acts on the input means, the corresponding command is transmitted through the reception/transmission means 64 of the remote control device 6 to the electronic control unit 2. At the electronic control unit 2 the transmission/reception means 20 receives signals (e.g., electromagnetic waves). The electronic control unit 2 also comprises actuation means adapted to send an appropriate command to the controlled equipment 4 which corresponds to the choice of the driver 80.

The proposed system can limit the number of remote controls onboard of a vehicle like a truck or another industrial vehicle. A single remote control device allows the driver to access all the truck functions. The user interface of the remote control device is automatically adapted to the need of the driver. The contextualised displays and controls improve the user experience for the driver.

Furthermore, the proposed system can be easily implemented on a vehicle. It can be adapted to a large number of kinds of vehicles. The cost of implementation is limited because the hardware is reduced in comparison to prior art solutions.

It is not excluded to consider using the above remote control device 6 also for keyless entry and for keyless start of the engine. In the state, the remote control device 6 also replaces a conventional key for door and ignition.

The invention claimed is:

1. A system for remote control displays and controls of truck functions, comprising:
    a remote control device with:
        a display with display control means for at least three user interfaces, each user interface corresponding to a predetermined set of truck functions,
        wireless transmission and reception means, and
        input means for selecting a function proposed on the display,
    actuation means corresponding to the proposed truck functions, and
    at least a sensor for detecting a position of at least one of a person and of the remote control device,
    wherein the display control means are configured to propose functions on the display depending on the information received from the at least one sensor for detecting a position, and
    wherein:
        the display with the display control means is for at least one user interface of the at least three user interfaces based on at least one of the person and the remote control device being detected outside the truck;
        the display with the display control means is for at least one user interface of the at least three user interfaces based on at least one of the person and the remote control device being detected sitting on a seat inside a cab of the truck; and
        the display with the display control means is for at least one user interface of the at least three user interfaces based on at least one of the person and the remote control device being detected in a bunk area of the cab of the truck.

2. The system of claim 1, wherein the remote control device is remotely connected to a single connecting point including the reception means and in relation with a control unit.

3. The system of claim 1, wherein there are at least three sensors using Ultra Wide Band (UWB) technology for detecting the position of the remote control device.

4. The system of claim 1, wherein the system also comprises a seat sensor.

5. The system of claim 1, wherein the system also comprises a bunk mattress sensor.

6. The system of claim 1, wherein the system also comprises a camera for controlling a position of a person in-out of a cab of the truck.

7. The system of claim 1, wherein the system also comprises ultra sonic sensors.

8. The system of claim 1, wherein the remote control device comprises at least one of a touchscreen and hardware buttons.

9. The system of claim 1, wherein the remote control device comprises at least one of a display, at least an LED, a sound feedback, and a vibration feedback.

10. A method for controlling a proposal of functions on a display of a remote control device, comprising:
    detecting, by at least one sensor, the location of at least one of a person and of the remote control device inside or outside an industrial vehicle,
    transmitting the detected position of at least one of the person and the remote control device to a control unit,
    determining a user interface among three predetermined user interfaces according to the detected position of at least one of the person and the remote control device and wherein each user interface proposes a set of truck functions that can be controlled by the remote control device,
    wherein determining the user interface comprises:
        determining at least one user interface of the predetermined user interfaces based on at least one of the person and the remote control device being detected outside the industrial vehicle;
        determining at least one user interface of the predetermined user interfaces based on at least one of the person and the remote control device being detected sitting on a seat inside a cab of the industrial vehicle; and
        determining at least one user interface of the predetermined user interfaces based on at least one of the person and the remote control device being detected in a bunk area of the cab of the industrial vehicle, and
    displaying the determined user interface on the display.

11. The method of claim 10, wherein if a person is detected inside the industrial vehicle, a further step determines if the person is sitting on a seat or lying on a bunk mattress.

12. The method of claim 10, wherein the spatial orientation of the remote control device is detected.

13. The method of claim 10, further comprising the detection of the position of the person and the detection of the position of the remote control device.

14. A truck comprising the system for remote control displays and controls of truck functions of claim 1.

* * * * *